(No Model.)
C. A. MORSE & G. F. SHATTUCK.
ASH SIFTER.
No. 580,289. Patented Apr. 6, 1897.
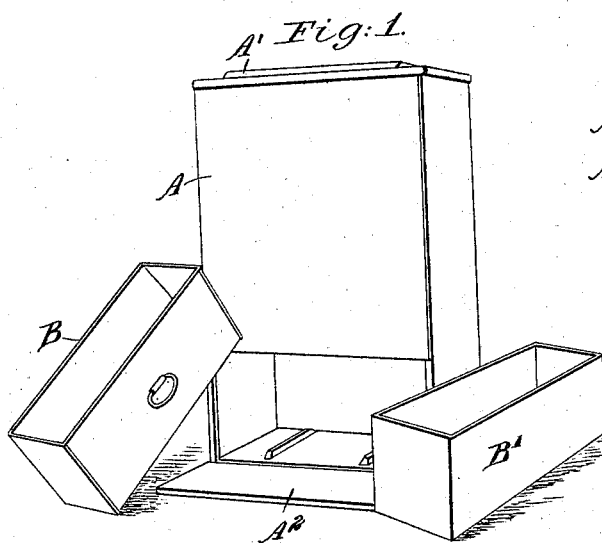
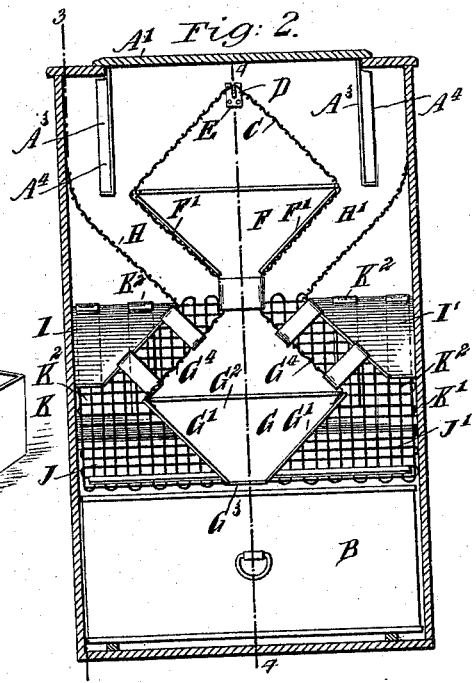
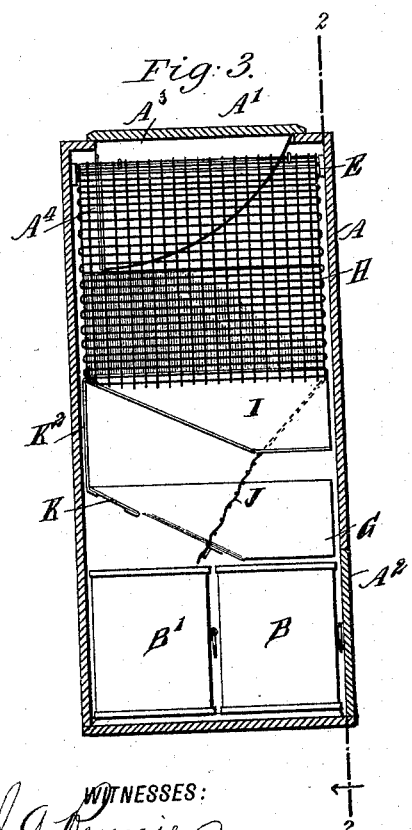
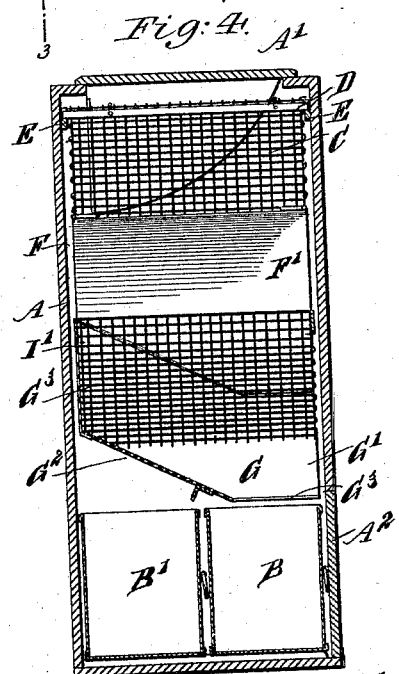
WITNESSES:
INVENTORS
C. A. Morse.
G. F. Shattuck.
BY
ATTORNEYS.

UNITED STATES PATENT OFFICE.

CHARLES A. MORSE AND GEORGE F. SHATTUCK, OF NEW YORK, N. Y.; SAID MORSE ASSIGNOR OF ONE-THIRD OF HIS RIGHT AND SAID SHATTUCK ASSIGNOR OF HIS RIGHT TO HENRY WOOLSON MORSE, OF SAME PLACE.

ASH-SIFTER.

SPECIFICATION forming part of Letters Patent No. 580,289, dated April 6, 1897.

Application filed April 10, 1896. Serial No. 586,997. (No model.)

*To all whom it may concern:*

Be it known that we, CHARLES A. MORSE and GEORGE FREDERICK SHATTUCK, of New York city, in the county and State of New York, have invented a new and Improved Ash-Sifter, of which the following is a full, clear, and exact description.

The object of the invention is to provide a new and improved ash-sifter which is simple and durable in construction and arranged to automatically separate the ashes from the coal and cinders.

The invention consists principally of a peak-shaped screen upon which the material to be sifted is discharged, a hopper under said screen, and a chute under said hopper and adapted to discharge into the ash-pan.

The invention also consists of certain parts and details and combinations of the same, as will be fully described hereinafter and then pointed out in the claim.

Reference is to be had to the accompanying drawings, forming part of this specification, in which similar characters of reference indicate corresponding parts in all the figures.

Figure 1 is a perspective view of the improvement with the ash-pan and coal-box removed. Fig. 2 is a sectional front elevation of the improvement on the line 2 2 of Fig. 3. Fig. 3 is a transverse section of the same on the line 3 3 of Fig. 2, and Fig. 4 is a like view of the same on the line 4 4 of Fig. 2.

The improved ash-sifter is provided with a suitably-constructed casing A, provided at the top with a lid A', adapted to be raised to permit of introducing the material to be sifted into the upper end of the casing A. The lower front portion of the casing A is formed with a downwardly-swinging door $A^2$ to permit of introducing or removing the ash-pan B or the coal-box B' to and from the lower end of the casing.

Carried by the under side of the lid A are two segmental deflectors $A^3$, each fixed at one straight edge to the cover and having each at their remaining straight edges flanges $A^4$, which abut against the under side of the casing A when the lid A' is swung upward. These devices serve to hold the lid in place both when raised and lowered.

In the upper end of the casing A and approximately at the middle thereof is arranged a peak-shaped screen C, held on a transversely-extending bar D, adapted to rest in bearings E, secured to the inside of the casing at the front and back thereof. (See Figs. 3 and 4.)

Under the peak-shaped screen C is arranged a hopper F, having its solid sides F' extending transversely and inclined inwardly and downwardly from the lower ends of the sides of the screen C, as plainly indicated in Fig. 2. The lower ends of the solid sides F' discharge upon a chute G, having inwardly and downwardly inclined sides G' and a downwardly and forwardly inclined back $G^2$, all three leading to an opening $G^3$. (See Fig. 4.)

Now it will be seen that when the material to be sifted is passed into the top of the casing, then the material strikes the peak-shaped screen C, so that the main portion of the ashes falls through the meshes of the screen into the hopper F, which discharges into the chute G, delivering the ashes to the ash-pan B. The coal and cinders roll down the sides of the peak-shaped screen C and are deflected by the deflectors $A^3$ downwardly upon screens H H', reaching from the sides of the casing A inwardly and downwardly a suitable distance under the solid sides F' of the hopper F, so as to form a passage-way for the coal and cinders.

Under the screens H H' are arranged chutes I I', respectively, adapted to receive the ashes passing through the meshes of the screens H H'. Each of the chutes I I' discharges at its front end into the ash-pan B, so that said ashes passing through the screens H H' are delivered to the pan B near the ends thereof. The coal and cinders rolling down and in an inward direction on the screens H H' are discharged upon the upper ends of the inclined screen-tops $G^4$, forming part of the chute G, said tops $G^4$ extending from the lower ends of the sides F' to the upper ends of the sides G'. Any ashes carried along by the cinders and coal and not delivered to the chutes I I' separate when coming in contact with the tops $G^4$, so that the thus-separated ashes can pass into the interior of the chute G to be delivered by the same to the ash-pan B. The coal and cinders roll down the inclined tops $G^4$ in a downward and outward direction to finally strike the screens J J', extending longitudinally and inclined upwardly and rearwardly, as plainly indicated in Fig. 3.

The rear lower ends of the screens J J' discharge into the coal-box B', so that the coal and cinders after having traveled over the several screens C H H' $G^4$ J J' are finally delivered into the coal-box B' freed of all ashes. The rear ends of the tops $G^4$ discharge upon deflectors K K', extending from the back of the casing A forwardly and downwardly to prevent the coal and cinders from lodging between the box B' and the back of the casing. The deflectors K K' are supported by strips $K^2$ from the upper rear ends of the chutes I I'. Now it will be seen that any ashes carried along by the cinders, passing over the screens J J', are separated from the cinders and pass through said screens into the ash-pan B, located under said screens, as indicated in Fig. 3. It will further be seen that by the arrangement described the cinders and coal travel in a zigzag course to finally reach the coal-box B', and said coal and cinders in passing from one screen to the other drop a suitable distance, so that in striking the screen below they cause a separation of the ashes adhering to the coal, the ashes passing, as previously described, into the ash-pan B.

Having thus fully described our invention, we claim as new and desire to secure by Letters Patent—

An ash-sifter having a casing, the casing having an opening therein, sifting devices within the casing, a cover for the opening, and two segmental plates fixed each at one straight edge to the cover and having at their remaining straight edges laterally-extending flanges, substantially as described.

CHARLES A. MORSE.
GEORGE F. SHATTUCK.

Witnesses:
THEO. G. HOSTER,
JNO. M. RITTER.